(12) United States Patent
Capito

(10) Patent No.: US 7,743,899 B2
(45) Date of Patent: Jun. 29, 2010

(54) ELECTROHYDRAULIC TORQUE TRANSFER DEVICE AND CONTROL SYSTEM

(75) Inventor: Russell T. Capito, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 415 days.

(21) Appl. No.: 11/804,404

(22) Filed: May 17, 2007

(65) Prior Publication Data

US 2007/0215428 A1    Sep. 20, 2007

Related U.S. Application Data

(63) Continuation-in-part of application No. 11/201,468, filed on Aug. 11, 2005, now Pat. No. 7,445,106.

(51) Int. Cl.
F16D 48/12    (2006.01)
F16D 48/06    (2006.01)

(52) U.S. Cl. .................. 192/54.3; 192/85.63; 192/82 T; 701/67

(58) Field of Classification Search ............... 192/85.63
See application file for complete search history.

(56) References Cited

U.S. PATENT DOCUMENTS

| | | | |
|---|---|---|---|
| 3,546,969 A | 12/1970 | Gibson et al. | |
| 4,862,769 A | 9/1989 | Koga et al. | |
| 4,909,371 A | 3/1990 | Okamoto et al. | |
| 4,923,029 A | 5/1990 | Lanzer | |
| 5,148,903 A | 9/1992 | Kobayashi et al. | |
| 5,224,906 A | 7/1993 | Sturm | |
| 5,680,917 A * | 10/1997 | Bray | 192/54.3 |
| 6,315,097 B1 | 11/2001 | Burns | |
| 6,398,686 B1 | 6/2002 | Irwin | |
| 6,461,267 B1 | 10/2002 | Paielli | |
| 6,581,741 B2 | 6/2003 | Taureg | |
| 6,595,086 B2 | 7/2003 | Kobayashi | |
| 6,672,420 B2 | 1/2004 | Porter | |
| 6,681,912 B2 | 1/2004 | Suzuki et al. | |

(Continued)

FOREIGN PATENT DOCUMENTS

JP    58 091927    6/1983

(Continued)

OTHER PUBLICATIONS

International Search Report for International Application No. PCT/US2009/041926, dated Dec. 16, 2009.

*Primary Examiner*—Rodney H Bonck
(74) *Attorney, Agent, or Firm*—Harness, Dickey & Pierce, P.L.C.

(57) ABSTRACT

A power transmission device includes a rotatable input member, a rotatable output member, a friction clutch to selectively transfer torque between the input member and the output member, an actuator providing an actuating force to the friction clutch and a controller. The actuator includes an electric motor having an output shaft drivingly coupled to a gerotor. The gerotor is operable to supply pressurized fluid to a piston acting on the friction clutch. The controller controls the actuator in response to a four-wheel lock request to provide one of a minimum output torque and an output torque greater than a vehicle requested torque to operate the friction clutch in a locked mode.

19 Claims, 6 Drawing Sheets

U.S. PATENT DOCUMENTS

| | | |
|---|---|---|
| 6,681,913 B2 | 1/2004 | Lee |
| 6,725,989 B1 | 4/2004 | Krisher et al. |
| 6,745,879 B1 | 6/2004 | Dolan |
| 6,817,434 B1 | 11/2004 | Sweet |
| 6,848,555 B2 * | 2/2005 | Sakata et al. .............. 192/85 R |
| 6,945,374 B2 | 9/2005 | Puiu |
| 7,210,566 B2 | 5/2007 | Baxter, Jr |
| 7,296,669 B2 | 11/2007 | Quehenberger et al. |
| 7,369,930 B2 * | 5/2008 | Hsieh et al. ................... 701/67 |
| 2007/0175721 A1 | 8/2007 | Nett et al. |
| 2007/0215428 A1 | 9/2007 | Capito |
| 2008/0064569 A1 | 3/2008 | Baxter et al. |

FOREIGN PATENT DOCUMENTS

| | | |
|---|---|---|
| JP | 09 112592 | 5/1997 |
| JP | 2002326522 A | 11/2002 |
| WO | WO 02/079664 | 10/2002 |

* cited by examiner

ELECTROHYDRAULIC TORQUE TRANSFER DEVICE AND CONTROL SYSTEM

CROSS-REFERENCE TO RELATED APPLICATIONS

This application is a continuation-in-part of U.S. patent application Ser. No. 11/201,468 filed on Aug. 11, 2005. The disclosure of the above application is incorporated herein by reference.

BACKGROUND AND SUMMARY OF THE INVENTION

The present invention relates generally to a power transmission device operable to selectively transfer torque between first and second sets of drivable wheels of a vehicle. More particularly, the present invention is directed to a power transmission device adapted for use in motor vehicle driveline applications having an actuator including an electric motor drivably coupled to a gerotor for providing pressurized fluid to a piston acting on a friction clutch.

Due to increased demand for four-wheel drive vehicles, many power transmission systems are typically being incorporated into vehicle driveline applications for transferring drive torque to the wheels. Many vehicles include a power transmission device operably installed between the primary and secondary drivelines. Such power transmission devices are typically equipped with a torque transfer mechanism for selectively transferring drive torque from the primary driveline to the secondary driveline to establish a four-wheel drive mode of operation. At least one known torque transfer mechanism includes a dog-type lock-up clutch that may be selectively engaged for rigidly coupling the secondary driveline to the primary driveline when the vehicle is operated in four-wheel drive mode. Drive torque is delivered only to the primary driveline when the lock-up clutch is released and the vehicle operates in a two-wheel drive mode.

Another type of power transmission device is operable for automatically directing drive torque to the secondary wheels without any input or action on the part of a vehicle operator. When traction is lost at the primary wheels, four-wheel drive mode is engaged. Some transfer cases are equipped with an electrically-controlled clutch actuator operable to regulate the amount of drive torque transferred to a secondary output shaft as a function of changes in vehicle operating characteristics such as vehicle speed, throttle position and steering angle. Typically in the power transfer device is a clutch positioned within the transfer case housing.

While many power transfer devices are currently used in four-wheel drive vehicles, a need exists to advance the technology and recognize the system limitations. For example, the size, weight and packaging requirements of the power transmission device may make such system costs prohibitive in some four-wheel drive applications.

The present invention provides a power transmission device including a friction clutch operable to selectively transfer torque between an input member and an output member. An actuator is operable to provide an actuating force to the friction clutch. The actuator includes an electric motor having an output shaft drivingly coupled to a gerotor. The gerotor is operable to provide pressurized fluid to a piston acting on the friction clutch. The gerotor substantially dead-heads and the output shaft of the electric motor rotates at approximately 600 rpm during actuation of the friction clutch. However, the electric motor rotation speed may vary based on gerotor size, clearances between gerotor and gerotor housing, and the operating pressure.

In one embodiment, the power transmission device includes a controller operable to determine a magnitude of torque to be transferred. The controller controls the actuator to pressurize fluid within a closed cavity containing a piston acting on a friction clutch to generate the requested magnitude of torque. The controller is operable to vary the supply of electrical energy to the motor via pulse width modulation to vary the output of a positive displacement pump and vary the output torque of the friction clutch. The motor is operable to continuously rotate while torque is being transferred by the friction clutch.

A power transmission device may include a rotatable input member, a rotatable output member, a friction clutch to selectively transfer torque between the input member and the output member, an actuator providing an actuating force to the friction clutch and a controller. The actuator includes an electric motor having an output shaft drivingly coupled to a gerotor. The gerotor is operable to supply pressurized fluid to a piston acting on the friction clutch. The controller controls the actuator in response to a four-wheel lock request to provide one of a minimum output torque and an output torque greater than a vehicle requested torque to operate the friction clutch in a locked mode.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention is directed to a power transmission device that may be adaptively controlled for modulating the torque transferred between a rotatable input member and a rotatable output member. The torque transfer mechanism may be useful within motor vehicle drivelines as a stand-alone device that may be easily incorporated between sections of propeller shafts, directly coupled to a driving axle assembly, or other in-line torque coupling applications. Accordingly, while the present invention is hereinafter described in association with a specific structural embodiment for use in a driveline application, it should be understood that the arrangement shown and described is merely intended to illustrate an exemplary embodiment of the present invention.

Figure 1:
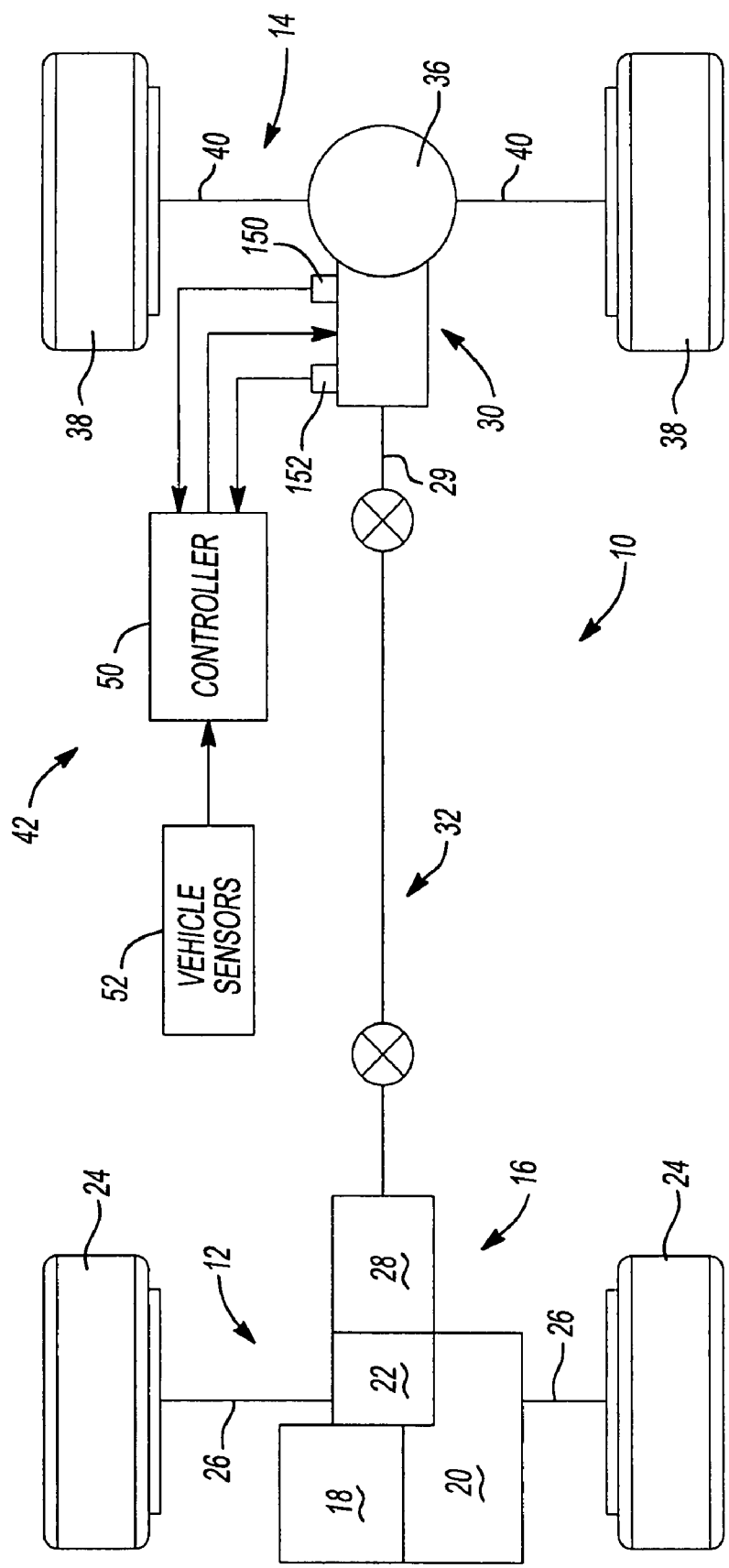
FIG. 1 is a schematic of a four-wheel drive vehicle equipped with a power transmission device of the present invention.

With reference to FIG. 1 of the drawings, a drive train 10 for a four-wheel vehicle is shown. Drive train 10 includes a first axle assembly 12, a second axle assembly 14 and a power transmission 16 for delivering drive torque to the axle assemblies. In the particular arrangement shown, first axle 12 is the front driveline while second axle 14 is the rear driveline. Power transmission 16 includes an engine 18 and a multi-speed transmission 20 having an integrated front differential unit 22 for driving front wheels 24 via axle shafts 26. A transfer unit 28 is also driven by transmission 20 for delivering torque to an input member 29 of a coupling 30 via a driveshaft 32. The input member 29 of the coupling 30 is coupled to driveshaft 32 while its output member is coupled to a drive component of a rear differential 36. Second axle assembly 14 also includes a pair of rear wheels 38 connected to rear differential 36 via rear axle shafts 40.

Drive train 10 is shown to include an electronically-controlled power transfer system 42 including coupling 30. Power transfer system 42 is operable to selectively provide drive torque in a two-wheel drive mode or a four-wheel drive mode. In the two-wheel drive mode, torque is not transferred via coupling 30. Accordingly, 100% of the drive torque delivered by transmission 20 is provided to front wheels 24. In the four-wheel drive mode, power is transferred through coupling 30 to supply torque to rear wheels 38. The power transfer system 42 further includes a controller 50 in communication with vehicle sensors 52 for detecting dynamic and operational characteristics of the motor vehicle. The controller is operable to control actuation of coupling 30 in response to signals from vehicle sensors 52. The controller 50 may be programmed with a predetermined target torque split between the first and second sets of wheels. Alternatively, the controller may function to determine the desired torque to be transferred through coupling 30 via other methods. Regardless of the method used for determining the magnitude of torque to transfer, controller 50 operates coupling 30 to maintain the desired torque magnitude.

Figure 2:
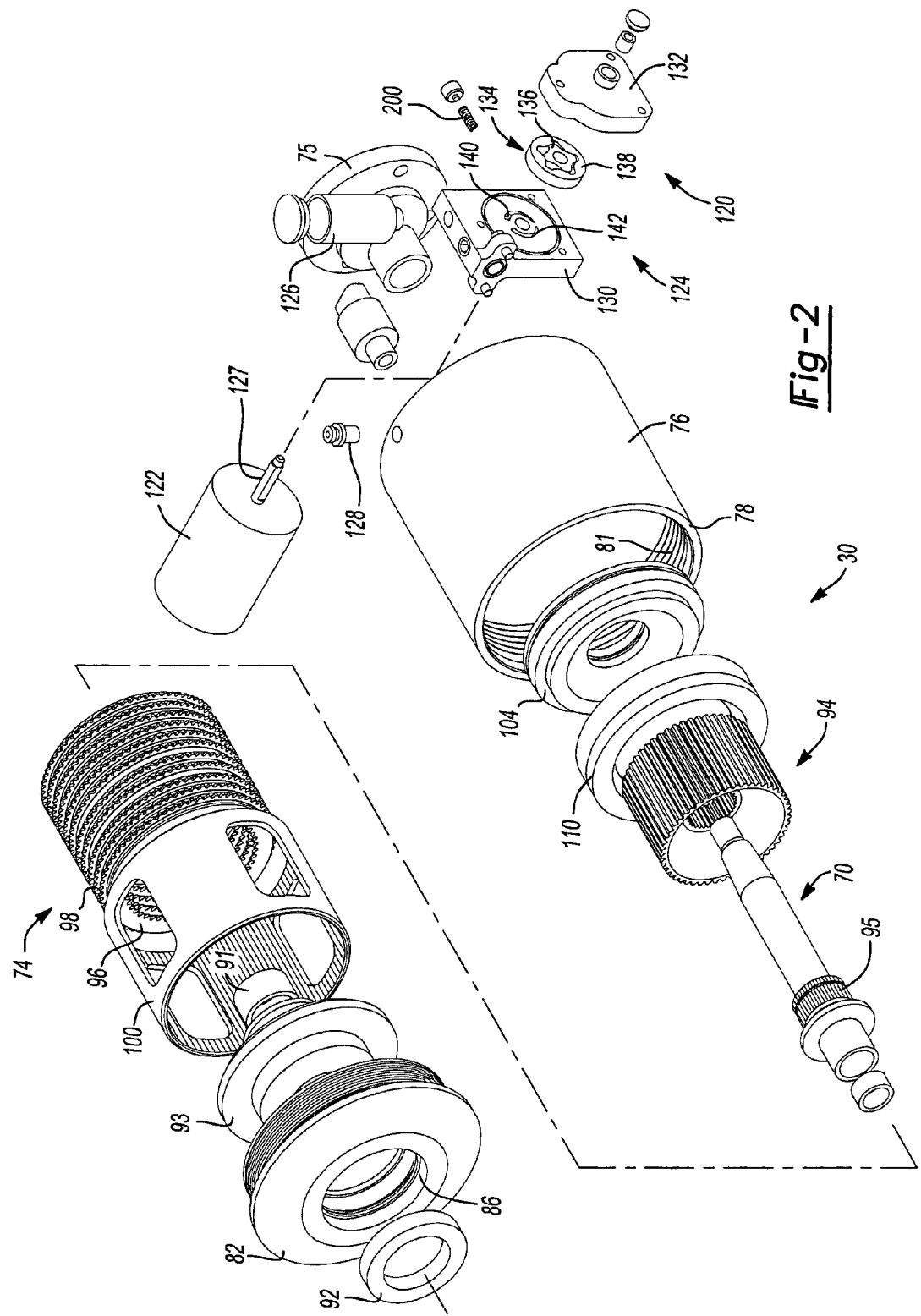
FIG. 2 is an exploded perspective view of an exemplary power transmission device.
Figure 3:
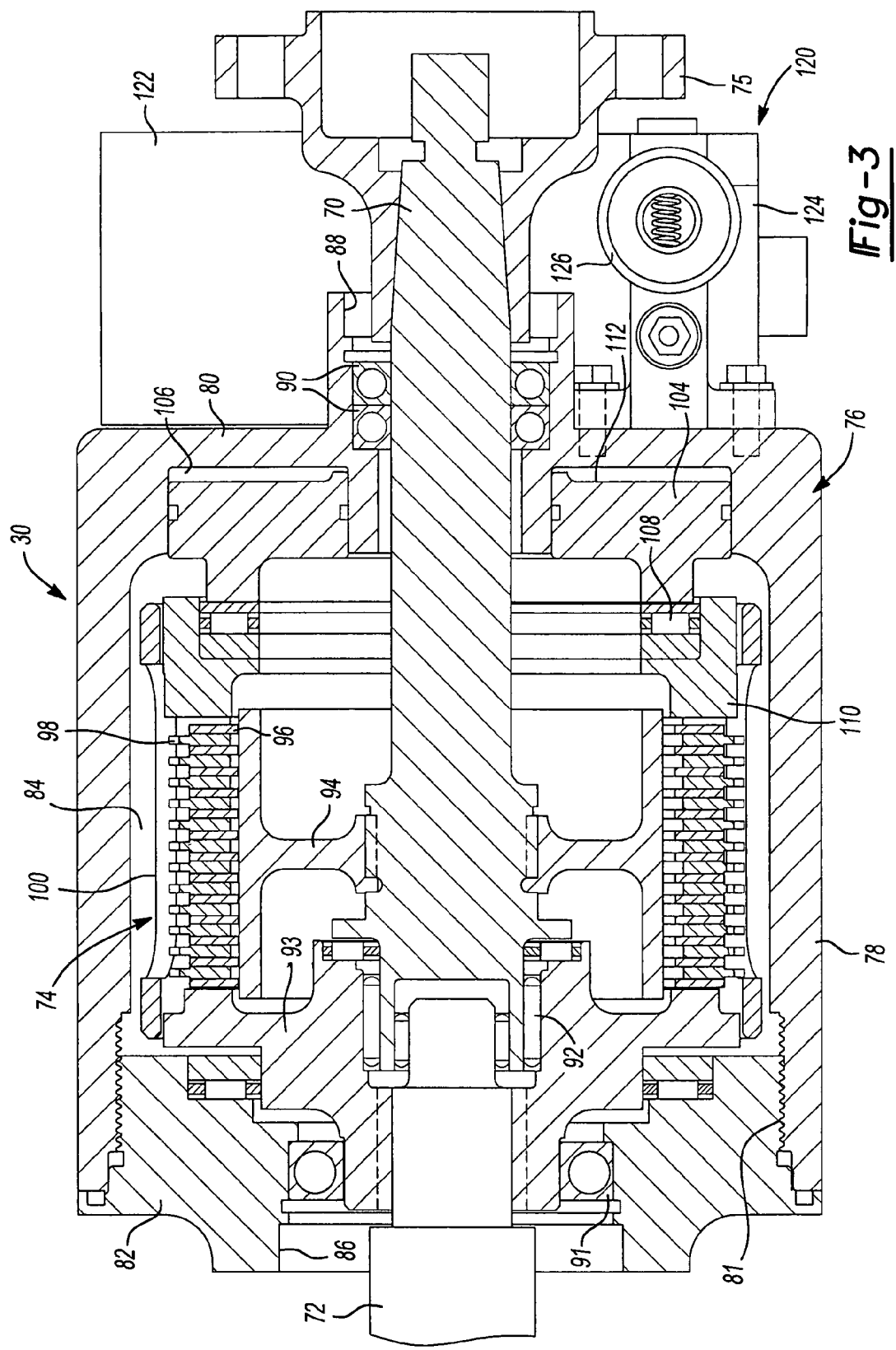
FIG. 3 is a cross-sectional side view of the power transmission device of FIG. 2.
Figure 4:
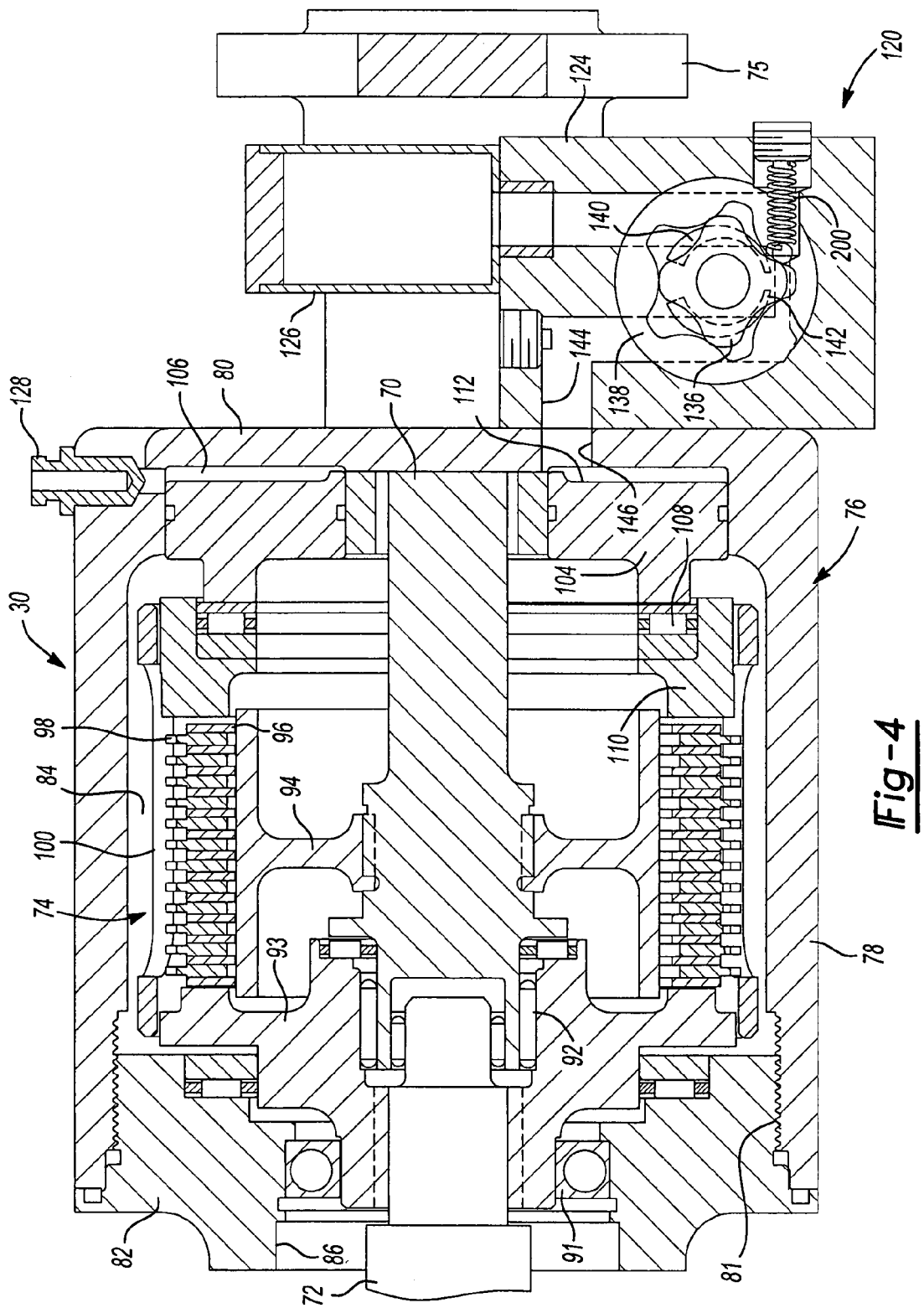
FIG. 4 is another cross-sectional side view of the power transmission device of FIG. 2.

FIGS. 2-4 depict coupling 30 in greater detail. Coupling 30 includes an input shaft 70 selectively drivingly coupled to an output shaft 72 via a friction clutch 74. A drive flange 75 is mounted on one end of input shaft 70 to provide a mounting provision for a driveline component such as driveshaft 32.

Coupling 30 includes a substantially cup-shaped housing 76 having a substantially cylindrically-shaped side wall 78 and an end wall 80. Side wall 78 includes an internally threaded portion 81 near the open end of housing 76. An end cap 82 is threadably engaged with threaded portion 81 to define a cavity 84. Alternatively, end cap 82 may be fastened to the housing using other techniques including spaced apart threaded fasteners. End cap 82 includes an aperture 86 extending therethrough. A portion of output shaft 72 extends through aperture 86. Housing 76 includes an aperture 88 extending through end wall 80. A portion of input shaft 70 extends through aperture 88. Bearings 90 are positioned within aperture 88 to rotatably support input shaft 70. Bearings 91 and 92 rotatably support an output spindle 93. Input shaft 70 includes a splined portion 95 (FIG. 2) drivingly coupled to a hub 94. A set of inner friction plates 96 are drivingly coupled to hub 94 via a splined engagement. Inner friction plates 96 are interleaved with a plurality of outer friction plates 98. Outer friction plates 98 are in splined engagement with a drum 100. Drum 100 is drivingly coupled to output spindle 93. Output spindle 93 is coupled with output shaft 72 via another splined interface. In the embodiment depicted, friction clutch 74 is a wet clutch. Accordingly, clutch fluid is contained within cavity 84 in communication with friction plates 96 and 98.

A piston 104 is slidably positioned within a cavity 106 formed within housing 76. Piston 104 is axially moveable into engagement with a thrust bearing 108 and an apply plate 110. When pressurized fluid acts on a face 112 of piston 104, piston 104 translates and applies a force through thrust bearing 108 and apply plate 110 to the plurality of interleaved clutch plates 96 and 98. Torque is transferred between input shaft 70 and output shaft 72 via the components previously described when friction plates 96 and 98 are forced into contact with one another.

An actuator 120 is mounted to housing 76 to selectively supply pressurized fluid to cavity 106 and provide an apply force to friction clutch 74. Actuator 120 includes an electric motor 122, a pump 124, and a reservoir 126. Electric motor 122 includes an output shaft 127 drivingly engaged with pump 124 such that rotation of the output shaft of the electric motor causes fluid within reservoir 126 to be pressurized and enter cavity 106. A bleed screw 128 is coupled to housing 76 in communication with cavity 106. Bleed screw 128 functions to allow an operator to purge trapped air from the closed hydraulic system. This minimizes the power required to compress trapped air.

Pump 124 includes a housing having a first half 130, a second half 132 and a gerotor 134. Gerotor 134 includes an inner gear 136 and an outer rotor 138 in engagement with one another. Inner gear 136 is drivingly coupled to the output shaft of electric motor 122. In operation, low pressure fluid passes through an inlet port 140 formed in housing half 130. Inlet port 140 is in fluid communication with reservoir 126. Rotation of inner gear 136 relative to outer rotor 138 causes a pumping action to force highly pressurized fluid through an outlet port 142 formed in housing half 130. Outlet port 142 is in fluid communication with a passageway 144 formed in pump housing half 130. Passageway 144 is positioned in fluid communication with an aperture 146 formed in housing 76. In this manner, fluid output from gerotor 134 is supplied to cavity 106 to act on piston 104.

One skilled in the art should appreciate that gerotor 134 acts on a closed volume of fluid located within passageway 144 and cavity 106. Because gerotor acts on the closed volume of fluid, electric motor 122 rotates at a relatively high rpm for only a relatively short amount of time when the clearance between piston 104, thrust bearing 108, apply plate 110 and the interleaved friction plates 96 and 98 is eliminated. After the clearance has been taken up, piston 104 transfers force to apply plate 110 to cause friction clutch 74 to generate torque. At this time, piston 104 does not axially move and gerotor 134 enters a near dead-head mode. Due to the existence of a clearance between inner gear 136 and outer rotor 138 of gerotor 134, as well as a clearance between gerotor 134 and the pump housing, the output shaft of electric motor 122 continues to rotate inner gear 136 at a relatively low rotational speed dependent on gerotor size, clearances and pressure to maintain a desired pressure acting on piston 104. Some of the fluid trapped within passageway 144 and cavity 106 passes by inner gear 136 and outer rotor 138 in the reverse direction thereby allowing the output shaft of the electric motor to continue to rotate. If the gerotor were completely sealed and did not allow any backflow or blow by, the electric motor would be forced to stop due to the incompressible nature of the fluid being pumped by gerotor 134.

Figure 5:
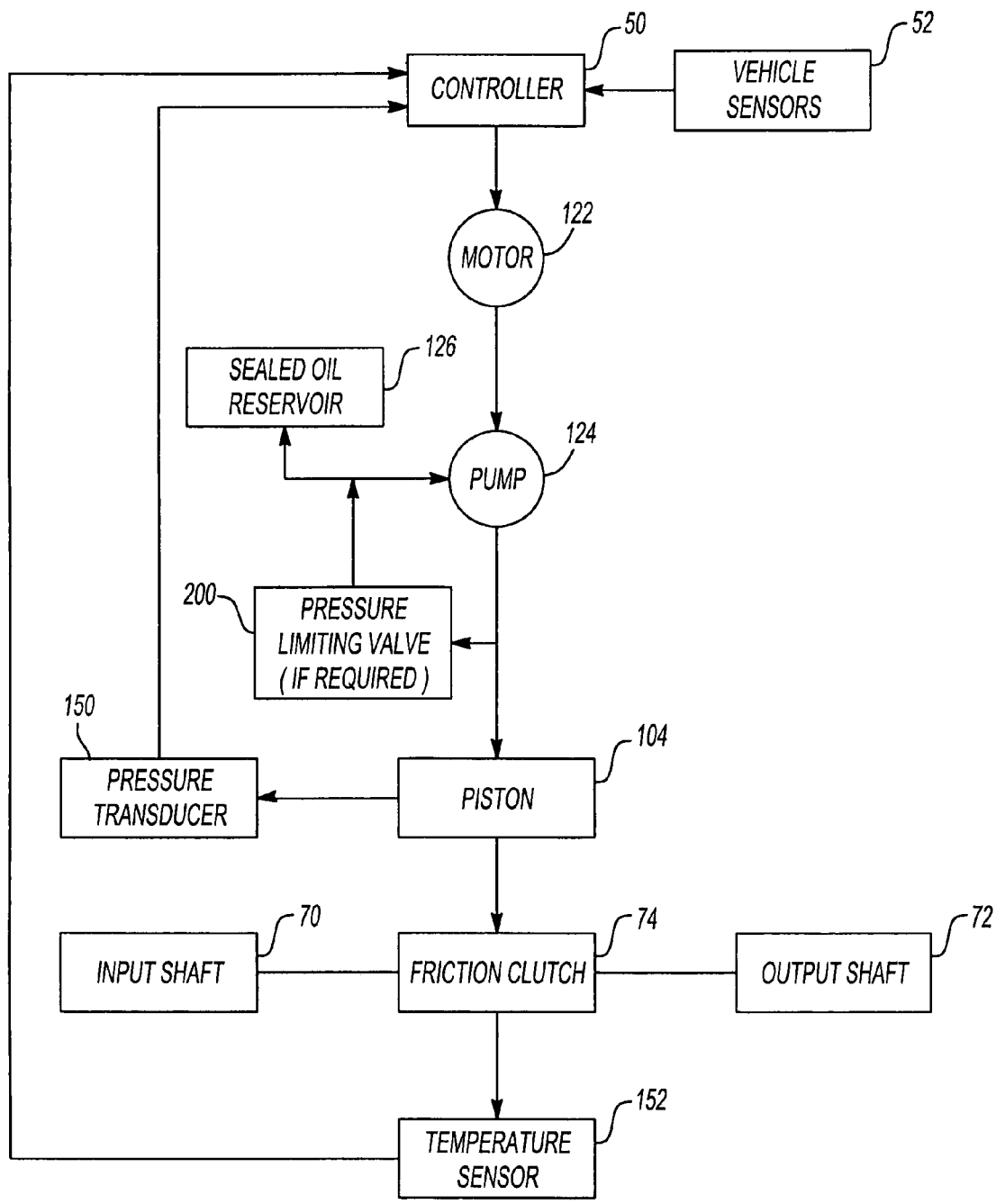
FIG. 5 is a schematic depicting the components of a torque transfer system including the power transmission device of the present disclosure.

As shown in FIG. 5, controller 50 is in communication with electric motor 122 as well as a pressure transducer 150. Pressure transducer 150 is operable to output a signal indicative of the fluid pressure within cavity 106. Controller 50 operates using a closed-loop feedback control to actuate electric motor 122 to maintain a target pressure acting on piston 104. Controller 50 is operable to provide a pulse width modulated signal to electric motor 122 to vary the output speed of the motor and the output pressure generated by pump 124. The pressure within cavity 106 should be proportional to the magnitude of torque output by friction clutch 74. By controlling the pressure maintained within cavity 106, the torque transferred through coupling 30 is controlled. Furthermore, a temperature sensor 152 is coupled to coupling 30 and is operable to provide controller 50 a signal indicative of the temperature of the clutch fluid contained within cavity 84. The controller 50 is programmed to vary the coupling control strategy based on clutch fluid temperature. The control strategy attempts to protect the clutch fluid from overheating.

In an alternate embodiment, a pressure relief valve 200 (FIGS. 4 and 5) is plumbed in communication with the high pressure passageway 144. Pressure relief valve 200 is operable to allow pressurized fluid to pass from the high pressure side of pump 124 to the low pressure side at reservoir 126. Pressure relief valve 200 provides a path for the fluid within the previously described closed volume to escape. When pressure relief valve 200 allows flow therethrough, electric motor 122 may be operated at a higher rotational speed than previously described in the near dead-head operational mode of the pump. Depending on the type of electric motor fitted to coupling 30, it may be more or less desirable to incorporate pressure relief valve 200 into coupling 30. Specifically, if the electric motor may be operated at relatively low rotational speeds between 0-100 rpm for extended duration, it may not be necessary to include a pressure relief valve. On the contrary, if an electric motor design is chosen than must operate at higher rotational speeds, it may be desirable to include the pressure relief valve in order to provide a flow path for the fluid. It should also be appreciated that any number of gear arrangements may be inserted between the output shaft of electric motor 122 and the inner gear 136 of gerotor 134 thereby allowing the motor to operate a higher rotational speed while rotating the pump components at a low rotational speed. If a speed reducing gearset is used, a pressure relief valve is not necessarily required. Similarly, a pressure relief valve may be alleviated by optimizing the pump size, pump and housing clearances and the operating pressure.

Figure 6:
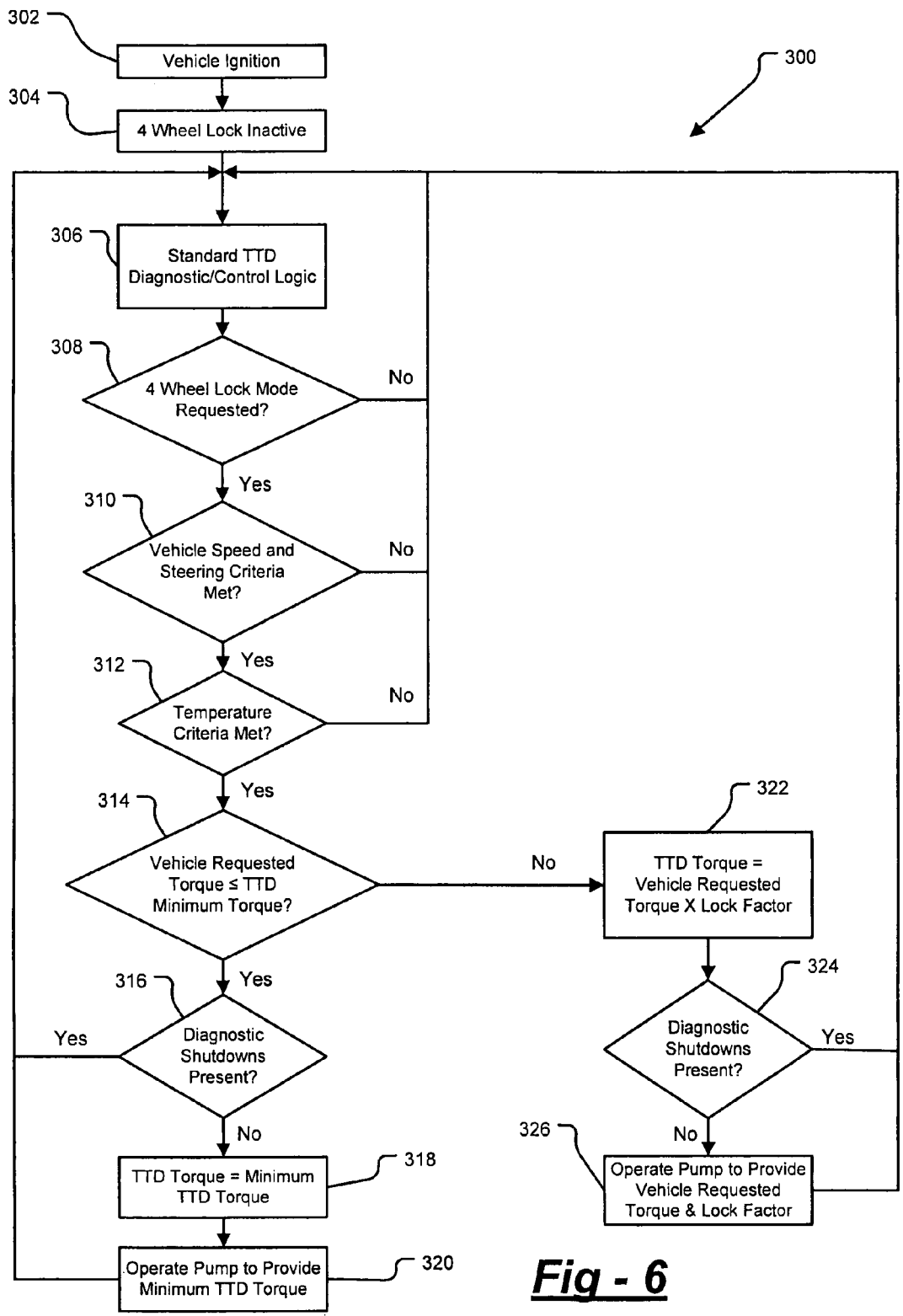
FIG. 6 is a flow chart relating to a four-wheel lock mode of operation.

FIG. 6 provides a control logic flow diagram for an optional four-wheel drive lock mode of operation. A control system 300 for the four-wheel lock feature begins at a vehicle ignition step 302. Once vehicle ignition is on, control proceeds to step 304 where the four-wheel lock mode is inactivated.

A standard torque transmitting device diagnostic and control logic is implemented at step 306. Control proceeds to a decision block 308 where control determines whether a four-wheel lock mode has been requested. Four-wheel lock mode may be requested by any number of means such as a user operated switch preferably located on the dashboard or otherwise near the vehicle operator. Additionally, a signal requesting four-wheel lock mode may be transmitted by the vehicle's bus from other systems such as a stability control system.

If a four-wheel lock mode has not been requested, control returns to block 306 where standard torque transmitting device diagnostic and control logic is implemented. If it is determined that a four-wheel lock mode has been requested, control continues to a decision block 310. Control determines whether a vehicle speed is within a predetermined range and whether a steering input is within a predetermined range as well. If both the vehicle speed and steering criteria are not met, control returns to block 306. If the vehicle speed and steering criteria have been met, control continues to a decision block 312. Block 312 determines whether a temperature of the clutch fluid temperature contained within cavity 84 is less than a predetermined value. The temperature of the clutch fluid may be indicated by a signal output from temperature sensor 152 or calculated using a temperature model. If the temperature of the clutch fluid is greater than or equal to the predetermined value, control returns to block 306. If the clutch fluid temperature is less than the predetermined temperature, control continues to a decision block 314.

Block 314 determines whether a vehicle requested torque is less than the torque transmission device minimum torque. Vehicle requested torque may be determined by monitoring the throttle input from the vehicle driver. The torque transmission device minimum torque may be set by determining the amount of pressure the pump motor may sustain for extended periods of operation without exceeding its operational temperature limit. This minimum torque value may be adjusted according to ambient conditions and vehicle operating conditions. For example, the torque transmission device minimum torque may be decreased if ambient air temperature is greater than a threshold. Furthermore, the preset minimum torque transmission device torque may also be decreased if the vehicle supply voltage is low. Other operating conditions may be evaluated to vary the torque transmission device minimum torque.

If block 314 determines that the vehicle requested torque is less than or equal to the torque transmission device minimum torque, control continues to a decision block 316. Decision block 316 determines whether diagnostic shut down conditions are present. If a diagnostic system or some other vehicle system indicates that four-wheel lock mode should not be entered, it is considered to be a diagnostic shut down. Accordingly, control returns to block 306 where standard torque transmission device diagnostic and control logic is implemented.

If a diagnostic shut down signal is not present, control proceeds to block 318 where transfer device torque is set to the torque transfer device minimum torque. Control continues to step 320 where pump 124 is controlled to provide the minimum torque transfer device torque. For example, coupling 30 may be operated by providing a current of approximately 3 amps to electric motor 122. Electric motor 122 drives pump 124 to output pressurized fluid from outlet port 142 at approximately 50 psi. Fifty psi acts on piston 104 to compress the clutch plates of friction clutch 74. Based on this arrangement, a minimum torque will be transferred through coupling 30. For the magnitude of current and pressure developed within the example previously described, it is estimated that 500 Nm of torque will be produced by coupling 30. It should be appreciated that the magnitude of torque, pressure developed and current provided are merely examples. Other values may be used depending on the particular characteristics of the motor, pump and clutch being used. In one example, the torque transfer device minimum torque corresponds to the torque that may be maintained for an extended period of time operating coupling 30 at an ambient temperature of 70° F. without forced air flow. Once the pump is operating to provide the minimum torque transfer device torque, control returns to block 306.

Returning to decision block 314, if vehicle requested torque is greater than the torque transfer device minimum torque, control continues to block 322. Block 322 sets the torque transfer device torque to the vehicle requested torque multiplied by a lock factor. Block 322 is structured in this manner to minimize the time at which friction clutch 74 of coupling 30 may be less than fully locked. More particularly, it is desirable to minimize the heat generated by the coupling 30 during operation. Less heat is generated if friction clutch 74 operates in a fully locked mode as opposed to a mode where the interleaved clutch plates 96 and 98 of friction clutch 74 engage one another but also slip relative to one another. Accordingly, when a vehicle torque is requested, it is desirable to set the maximum torque transferable by coupling 30 to a value slightly higher than the vehicle requested torque to allow friction clutch 74 to operate in a locked mode.

By way of example, if the driver throttle input equates to a torque request of 700 Nm, control will increase current to motor 122 to provide a torque transfer device torque equal to 700 Nm times an exemplary lock factor of 1.1 equaling 770 Nm. Once the torque transfer device torque has been calculated at step 322, control continues to decision block 324.

Block 324 determines if diagnostic shut downs are present. In a manner substantially similar to the decisions made within block 316, block 324 returns control to block 306 if diagnostic shut downs are present. If diagnostic shut down signals are not present, control continues to a step 326 where pump 124 is operated to provide the torque transfer device torque equaling the vehicle requested torque times the lock factor. Once pump 124 is activated, control returns to block 306. If a vehicle requested torque exceeds the torque capacity of coupling 30, the maximum torque of coupling 30 will be provided but the interleaved plates 96,96 may slip relative to one another.

As an optional method to minimize motor heating, data may be collected relating to the wheel accelerations of the rear axle. If the wheel accelerations of the rear axle exceed the wheel acceleration produced by the vehicle's rear wheel skid torque, then the torque transfer device torque may be reduced to provide a torque that is slightly greater than the skid torque of the surface. For example, the torque transfer device torque may return to the torque transfer device minimum torque if the wheel accelerations have the characteristics of being on ice.

As another optional feature of the four-wheel lock system previously described, a lamp visible by the vehicle operator may be provided to indicate activity or inactivity of the four-wheel lock system. In particular, if the four-wheel lock mode has been requested but activation has been disabled or denied, then a dash lamp may be illuminated to indicate that four-wheel lock mode has not been entered. Also, a dash lamp may be continuously illuminated while the four-wheel lock mode is being provided.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A method of controlling a torque transfer device providing four-wheel drive, the method comprising:
   determining a temperature of a fluid within the torque transfer device;
   determining whether a vehicle requested torque is greater than a minimum torque transfer device output torque; and
   controlling the torque transfer device to output one of said minimum torque transfer device output torque and a torque greater than said vehicle requested torque to minimize slip between clutch plates of said torque transfer device when operating in a fully locked mode.

2. The method of claim 1 further including placing said torque transfer device in said fully locked mode when a steering input angle is within a predetermined range.

3. The method of claim 1 further including placing said torque transfer device in said fully locked mode when a vehicle speed is within a predetermined range.

4. The method of claim 1 wherein said controller determines a temperature of a fluid within said friction clutch and controls said actuator based on said temperature.

5. The method of claim 4 wherein said locked mode is not entered when said fluid temperature is above a predetermined value.

6. The method of claim 1 further including directing pressurized fluid from a pump along a single fluid line to directly act on a piston to actuate a friction clutch.

7. The method of claim 1 wherein said torque greater than said vehicle requested torque is determined by multiplying said vehicle requested torque by a lock factor greater than 1.

8. The method of claim 1 wherein the torque transfer device generates a magnitude of torque to maximize a time that said torque transfer device may operate before exceeding a threshold temperature.

9. The method of claim 8 further including varying said minimum output torque based on an ambient air temperature.

10. The method of claim 8 further including varying said minimum output torque based on a battery voltage.

11. A method of controlling a torque transfer device that is configured to transmit rotary power between a first component and a second component, the rotary power having a torque with a magnitude, the method comprising:
    establishing a magnitude of a minimum torque associated with the rotary power;
    determining whether a magnitude of a requested torque is greater than the magnitude of the minimum torque transfer device output torque;
    controlling the torque transfer device to output rotary power such that the magnitude of the torque of the rotary power is equal to the magnitude of the minimum torque when the magnitude of the minimum torque is greater than or equal to the magnitude of the requested torque; and
    controlling the torque transfer device to output rotary power such that the magnitude of the torque of the rotary power is greater than the magnitude of the requested torque when the magnitude of the minimum torque is less than the magnitude of the requested torque.

12. The method of claim 11, wherein a predetermined lock factor is employed when the magnitude of the minimum torque is less than the magnitude of the requested torque.

13. The method of claim 12, wherein the magnitude of the torque of the rotary power is equal to the product of the predetermined lock factor and the magnitude of the requested torque.

14. The method of claim 11, further comprising re-establishing the magnitude of the minimum torque based on one or more predetermined characteristics.

15. The method of claim 14, wherein the one or more predetermined characteristics comprises a temperature of a hydraulic fluid employed to control the magnitude of the torque of the rotary power.

16. The method of claim 14, wherein the one or more predetermined characteristics comprises an ambient air temperature.

17. The method of claim 14, wherein the one or more predetermined characteristics comprises a voltage output from a power supply.

18. The method of claim 11, wherein the torque transfer device comprises a friction clutch and wherein controlling the torque transfer device comprises controlling a force acting on the friction clutch.

19. The method of claim 18, wherein the force acting on the friction clutch is controlled via a fluid pressure.

* * * * *